United States Patent [19]

Nakane

[11] 4,151,918
[45] May 1, 1979

[54] TRANSFER DEVICE IN AN AUTOMATIC TOOL EXCHANGER

[75] Inventor: Masakazu Nakane, Okazaki, Japan

[73] Assignee: Toyoda-Koki Kabushiki-Kaisha, Aichi, Japan

[21] Appl. No.: 832,883

[22] Filed: Sep. 13, 1977

[30] Foreign Application Priority Data

Sep. 21, 1976 [JP] Japan ................................ 51/113247

[51] Int. Cl.² ............................................ B23Q 3/157
[52] U.S. Cl. ...................................... 414/736; 29/568
[58] Field of Search .............. 214/1 BB, 1 BC, 1 BD, 214/147 T; 29/568; 294/106

[56] References Cited

U.S. PATENT DOCUMENTS

| 3,760,958 | 9/1973 | Lohneis | 214/1 BD |
| 3,777,902 | 12/1973 | Potter | 214/1 BC X |
| 3,786,938 | 1/1974 | Kirkham | 214/1 BD |

FOREIGN PATENT DOCUMENTS

47-43273 11/1972 Japan ........................ 214/1 BD

Primary Examiner—L. J. Paperner
Attorney, Agent, or Firm—Oblon, Fisher, Spivak, McClelland & Maier

[57] ABSTRACT

A transfer device in an automatic tool exchanger is provided wherein a pair of transfer arms, each formed with semicircular openings at respective opposite ends thereof, are secured respectively to one of the ends of first and second support shafts and extend mutually in parallel relation and transversely of the support shafts. The support shafts are co-axially mounted to be bodily axially moved by a reciprocation drive device and also to be rotated by a first rotational drive device in the same direction. A second rotational drive device for rotating the support shafts in opposite directions is composed of a rotational cylinder with two rotors connected respectively to the support shafts, so that tools are maintained reliably gripped by the semicircular openings during tool transfer movements.

7 Claims, 6 Drawing Figures ated at the exchange station.

TRANSFER DEVICE IN AN AUTOMATIC TOOL EXCHANGER

BACKGROUND OF THE INVENTION

1. Field of the Invention

The present invention relates to a transfer device in an automatic tool exchanger for simultaneously exchanging a tool received in a machine tool spindle with another tool disposed at an exchange station.

2. Description of the Prior Art

Transfer devices of the character described for use in automatic tool exchangers have heretofore been provided wherein a pair of mutually parallel transfer arms are mounted to be rotatable about and slidable along a common axis. These transfer arms are further arranged to grip tools received in a tool spindle and a storage magazine when rotated in opposite directions at an axially withdrawn position, to extract the tools therefrom when axially extended to an extended position, and to replace mutual positions of the tools when rotated in the same direction at the extended position.

In one such known transfer device, disclosed in U.S. Pat. No. 3,786,938 to Edward E. Kirkham, a rack and pinion mechanism is provided to rotate a pair of transfer arms in opposite directions for the purpose of simultaneous tool gripping, and pinions are rotated in meshing engagement with the same rack for 180° rotation while mutual positions of the tools are replaced. Because of backlash existing between the rack and the pinions, the tools are never gripped without a gap being present between themselves and the transfer arms, so that reliable or tight tool gripping cannot be achieved. Further, in the tool removal operation, the pinions are transferred from engagement with another set of racks to engagement with the aforementioned rack, which thus requires that all the racks are exactly aligned prior to the tool removal operation, and therefore, considerable restraint is effected in adjusting the rotational angles of the transfer arms for tool gripping and tool transferring.

In another form of transfer device, first and second rack and pinion mechanisms are respectively associated with tandem cylinder assemblies for individually rotating a pair of transfer arms, allowing the transfer arms to be rotated independently, so that each one of a pair of tools can be reliably or tightly gripped without having a gap being present between itself and the transfer arms. However, three cylinders must be provided in each of the tandem cylinder assemblies for effecting tool gripping, tool removal and tool releasing, and therefore, the transfer device, although freed from gear transferring of pinions, is complicated in construction and difficult to control.

SUMMARY OF THE INVENTION

It is therefore an object of the present invention to provide an improved transfer device in an automatic tool exchanger which is simple in construction and is reliable in operation.

Another object of the invention is to provide an improved transfer device in an automatic tool exchanger in which reliable tool gripping is accomplished by the use of a rotational drive device with no gear backlash.

A further object of the invention is to provide an improved transfer device of the character described herein in which gear transferring from a rack to another rack in a tool removal movement is precluded, so as to make adjustment concerning rotational motion of the transfer arms easy to accomplish.

Briefly, according to the present invention, there is provided a transfer device in an automatic tool exchanger, which comprises first and second support shafts co-axially mounted for rotational and axial movement, a pair of transfer arms respectively secured to the support shafts and extending mutually in parallel relation and radially of the shafts, the transfer arms being formed at respective opposite ends with gripping portions, a first rotational drive device for rotating the support arms in opposite directions in a tool gripping operation, a reciprocation drive device for bodily and axially moving the support shafts in a tool removal and reinsertion operation, and a second rotational drive for rotating the transfer arms in the same direction in a tool transferring operation.

The first rotational drive device is composed of a rotational actuator with two rotors respectively connected to the support shafts, whereby unreliable tool gripping due to gear backlash can be avoided. Further, the first rotational drive device is arranged to be rotated by the second rotational drive device, so that gear transferring from one rack to another rack in the tool removal movement can be precluded.

BRIEF DESCRIPTION OF THE DRAWINGS

Various other objects, features and attendant advantages of the present invention will be more fully appreciated as the same becomes better understood by reference to the following detailed description of preferred embodiments when considered in connection with the accompanying drawings, in which.

DETAILED DESCRIPTION OF THE PREFERRED EMBODIMENTS

Figure 1:
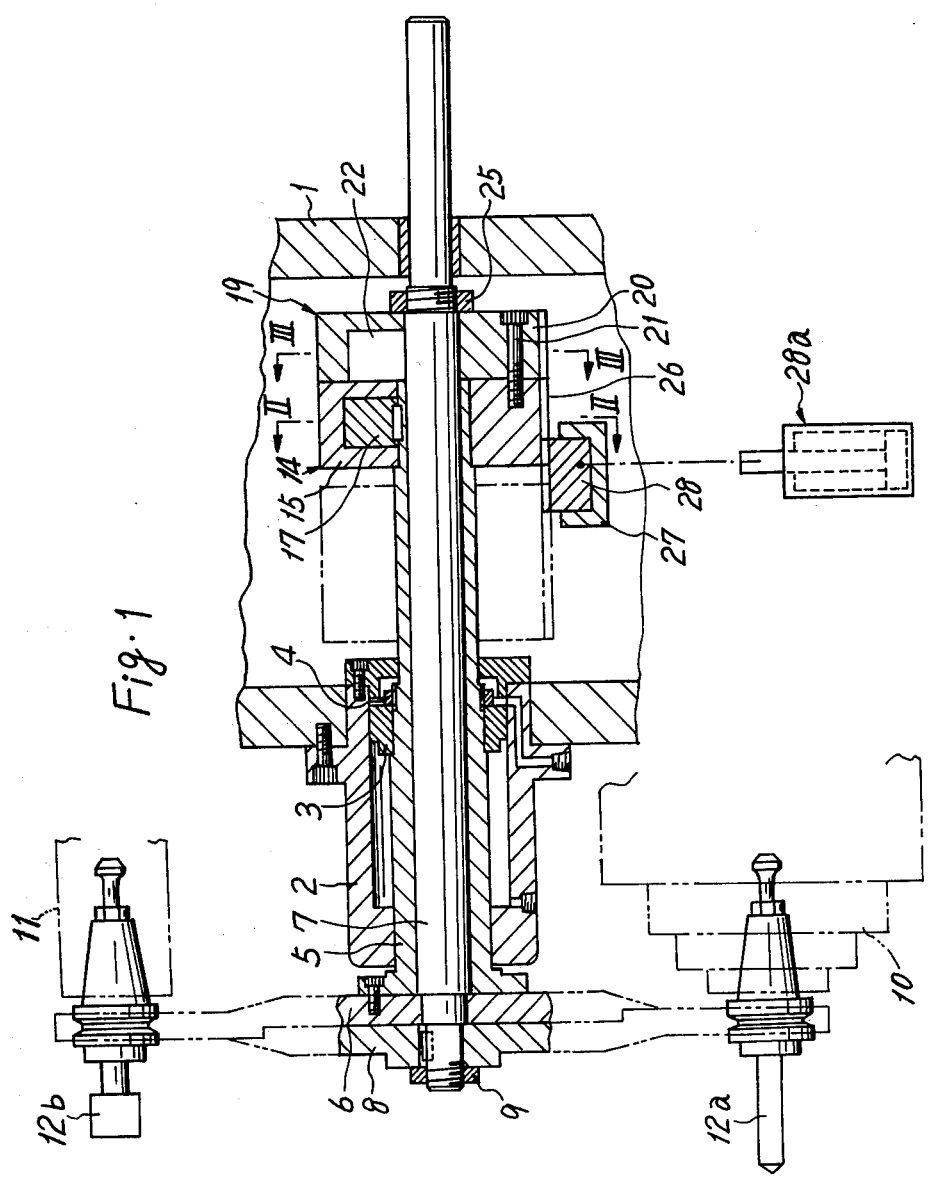
FIG. 1 is a longitudinal sectional view of a tool transfer device according to the present invention.
Figure 4:
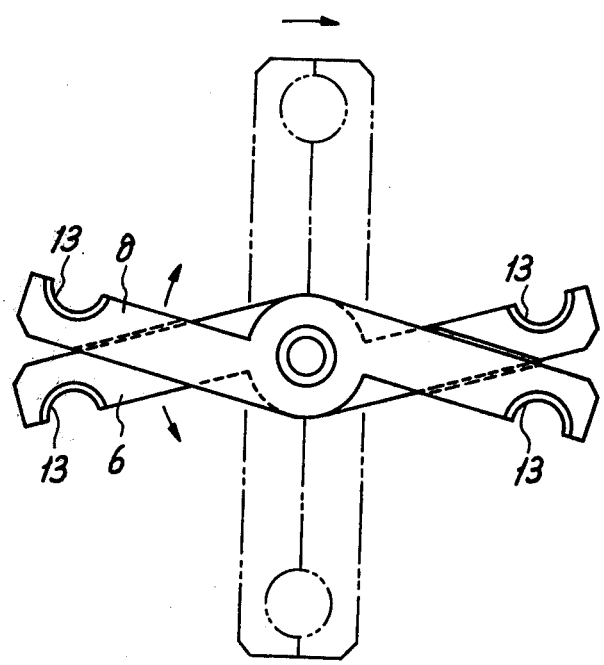
FIG. 4 is a front view of first and second transfer arms of the device.

Referring now to the drawings, wherein like reference numerals designate like or corresponding parts throughout the several views, and particularly to FIG. 1 thereof, a frame 1 has fixed thereon an arm advance and retraction cylinder 2, in which a piston 3 is slidably mounted. To this piston 3 there is secured, by a lock nut 4, a first support shaft 5, of tubular form, acting also as a piston rod thereof, and a first transfer arm 6 is secured to one end of the first support shaft 5. A second transfer arm 8 is key-fixed on one end of a second support shaft 7, which is co-axially received in a cylindrical bore of the first support shaft 5 to be rotatable and axially slidable therein. The first and second transfer arms 6 and 8 are superposed on each other, and extending mutually parallel relation and radially of the support shafts 5 and 7. The second transfer arm 7 is prevented, by means of a lock nut 9, from disconnection. At respective opposite ends of the first and second transfer arms 6 and 8, semi-circular openings 13 are formed, to simultaneously grip a tool received in a machine tool spindle 10 and a tool received in an intermediate arm 11 when the transfer arms 6 and 8 are closed, as indicated by the phantom line in FIG. 4. It is to be understood that the intermediate arm 11 constitutes a part of a tool storage magazine and is operable to transfer a tool from a magazine body, not shown, to an exchange station where it stands in FIG. 1, and vice versa, in a well-known manner.

Figure 3:
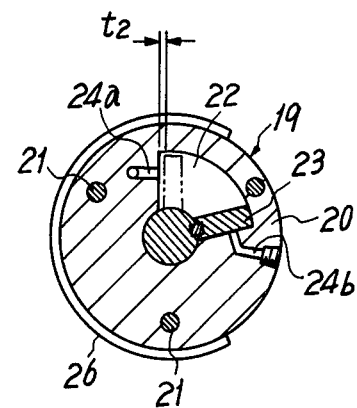
FIG. 3 is a sectional view of the device taken along the line III—III of FIG. 1.

At the other end of the first support shaft 5, there is provided a first rotational cylinder 14, whose cylinder housing 15 is formed with a sector chamber 16, within which a plate-like rotor 17, key-fixed on the first support shaft 5, is contained to be reciprocatively turnable in a circumferential direction of the first support shaft 5. Similarly, upon the second support shaft 7, a cylinder housing 20 of a second rotational cylinder 19 is co-axially and rotatably mounted and is secured by means of bolts 21 to the cylinder housing 15 of the first rotational cylinder 14. Formed in the cylinder housing 20 is another sector chamber 22, in which another plate-like rotor 23, key-fixed on the second support shaft 7, is contained to be reciprocatively turnable in a circumferential direction thereof, as shown in FIG. 3. The rotors 17 and 23 are respectively turnable within an angular extent, not more than 90°, in opposite directions in response to fluid under pressure which is charged into and from supply and exhaust ports 18a, 18b, 24a and 24b provided in the cylinder housings 15 and 20, whereby the first and second transfer arms 6 and 8 are selectively opened and closed.

Furthermore, the first and second rotational cylinders 14 and 19 are prevented, by means of a nut 25, from axial movement relative to the support shafts 5 and 7. A gear or pinion portion 26 is formed on the circumference of the cylinder housings 15 and 20 and is geared with a rack 28, which is slidably guided by a rack guide 27 so as to be reciprocated by a rack drive cylinder 28a in a tangential direction of the cylinder housings 15 and 20. The rack drive cylinder 28a is adjusted to rotate, through the rack 28, the cylinder housings 15 and 20 a half revolution. Accordingly, the transfer arms 6 and 8, when rotated bodily with the cylinder housings 15 and 20, serve to replace mutual positions of the tools 12a and 12b gripped thereby. The pinion portion 26 is extended axially of the cylinder housings 15 and 20 through a length sufficient always to engage with the rack 28.

The operation of the embodiment constructed above will hereinafter be described. In the original condition, the first and second transfer arms 6 and 8 are maintained opened, as shown by the solid line in FIG. 4, and the rotors 17 and 23 of the first and second rotational cylinders 14 and 19 are held, respectively, at the left side in the sector chamber 16 and at the right side in the second chamber 22, as viewed in FIGS. 2 and 3. Furthermore, the rack 28 is held at the retracted end thereof.

Figure 2:
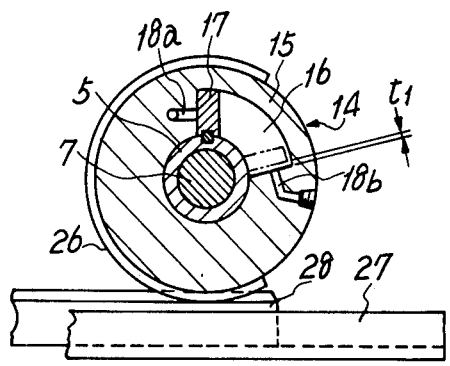
FIG. 2 is a sectional view of the device taken along the line II—II of FIG. 1.

When fluid under pressure is then charged into the chammber 16 of the first rotational cylinder 14, via the supply and exhaust port 18a, and simultaneously into the chamber 22 of the second rotational cylinder 19, via the supply and exhaust port 24b, the rotors 17 and 23 of the first and second rotational cylinders 14 and 19 are rotated, respectively, clockwise and counterclockwise, as viewed in FIGS. 2 and 3. Consequently, the first and second transfer arms 6 and 8 are rotated along with the first and second support shafts 5 and 7 in mutually opposite directions and, at their semicircular openings 13, they simultaneously grip the tools 12a and 12b being received in the machine tool spindle 10 and in the intermediate arm 11. It is to be understood that because the rotors 17 and 23 are respectively stopped with gaps t1 annd t2 between themselves and the right and left ends of the chambers 16 and 22, as indicated by the phantom line in FIGS. 2 and 3, the tools 12a and 12b are reliably or tightly gripped.

After the gripping of the tools 12a and 12b, fluid under pressure is charged into the right chamber of the cylinder 2 to advance the first and second support shafts 5 and 7, whereby the tools 12a and 12b, being now gripped by the transfer arms 6 and 8, are removed from the machine tool spindle 10 and the intermediate arm 11. While the first and second rotational cylinders 14 and 19 are advanced to such a position, as indicated by the phantom line in FIG. 1, the pinion portion 26 is maintained in meshing engagement with the rack 28.

Following this, the rack 28 is caused to slide by the rack drive cylinder 28a toward the right to rotate the rotational cylinders 14 and 19 in a counterclockwise direction, as viewed in FIGS. 2 and 3. As a result, the transfer arms 6 and 8 are turned through an angle of 180 degrees, together with the support shafts 5 and 7, in the same direction to thereby transfer the tools 12a and 12b, or in other words, to replace the mutual positions of the tools 12a and 12b. Subsequently, fluid under pressure is charged into the left chamber of the arm advance and retraction cylinder 2, whose piston 3 is thus retracted, together with the support shafts 5 and 7, and the tools 12a and 12b, being now gripped by the transfer arms 6 and 8, are reinserted, respectively, into the intermediate arm 11 and the tool spindle 10.

Thereafter, fluid under pressure is charged into the chambers of the rotational cylinders 14 and 19, respectively, via the supply and exhaust port 18b and the supply and exhaust port 24a. The rotor 17 is rotated counterclockwise and, at the same time, the rotor 23 is rotated clockwise, as viewed in FIGS. 2 and 3. In consequence, together with the support shafts 5 and 7, the transfer arms 6 and 8 are rotated in mutually opposite directions from the position indicated by the phantom line in FIG. 4 to the position indicated by the solid line so as to release the tools 12a and 12b. One cycle of the tool exchange operation is completed in this manner and, taking into consideration the tool transferring in the next tool exchange operation, turning movement of the transfer arms 6 and 8 is carried out as a result of the rack 28 being moved toward the left, as seen in FIG. 2.

Figure 5:
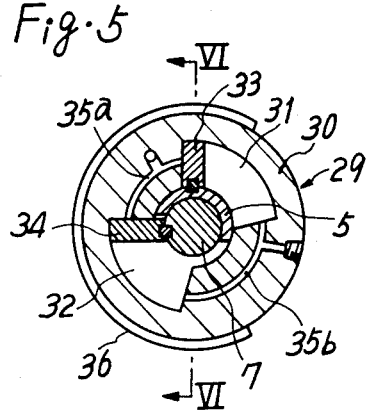
FIG. 5 is a cross-sectional view illustrating a rotational cylinder of another embodiment.
Figure 6:
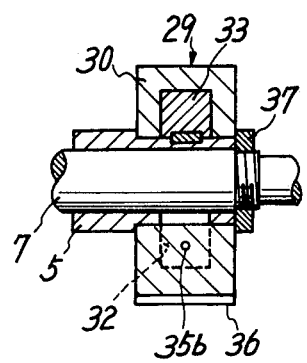
FIG. 6 is a sectional view of the rotational cylinder taken along the line VI of FIG. 5.

Another embodiment of the invention will hereinafter be described by reference to FIGS. 5 and 6. In this embodiment, one rotational cylinder 29 is used in lieu of the first and second rotational cylinders 14 and 19 in the foregoing embodiment. A cylinder housing 30, co-axially and rotatably mounted on the first support shaft 5, has formed therein, in a co-planar and symmetrical configuration, two sector chambers 31 and 32, one of which has contained therein a first rotor 33, key-fixed on the first support shaft 5. A second rotor 34, key-fixed on the second support shaft 7, is contained in the other chamber 32. It is noted that a part of the first support shaft 5 is cut out for allowing the mounting of the second rotor 34 onto the second support shaft 7. In addition, the cylinder housing 30 symmetrically provides therein common supply and exhaust ports 35a and 35b, which are in fluid communication, respectively, with both sides of the chambers 31 and 32. The reference numeral 36 denotes a pinion portion formed on the outer circumference of the cylinder housing 30 and the reference numeral 37 denotes a nut, which prevents axial movement of the cylinder 29 relative to the support shafts 5 and 7.

Since this embodiment is constructed as above, when fluid under pressure is alternatively charged into and discharged from the supply and exhaust ports 35a and 35b, the first and second rotors 33 and 34 are rotated in mutually opposite directions. It is possible, accordingly, to make the first and second transfer arms 7 and 8 perform gripping and releasing operations on the tools 12a and 12b.

Although a second rotational drive device, in the illustrated embodiments, which rotates transfer arms 6 and 8 in the same direction for the purpose of tool transferring, is constructed using the rack 28 reciprocated by the rack drive cylinder 28a and with the pinion 26 or 36 gearing therewith, it may be substituted by a rotational cylinder of the same configuration as the first and second rotational cylinders 14 and 19.

As described previously, the transfer device according to the present invention is so constructed that a tool gripping operation of the first and second transfer arms is carried out by the use of a rotational cylinder with rotors connected to the first and second support shafts, and gear backlash can therefore be precluded, such being peculiar to the prior art device of the gear type, including a rack and a pinion, so that reliable tool gripping can be achieved. In addition to this, because the tools, once gripped, are held without being loose until being released, the accidental dropping of tools, during tool transfer, which was heretofore a problem, can be avoided, and reliable tool transferring can therefore be achieved. Furthermore, because no gear transferring, from engagement with a rack to that with another rack, is performed, it is possible to freely and easily adjust through 180° the rotation of the transfer arms 6 and 8 for transferring of tools.

Obviously many modifications and variations of the present invention are possible in light of these teachings. It is therefore to be understood that within the scope of the appended claims, the present invention may be practiced otherwise than as specifically described herein.

What is claimed as new and desired to be secured by Letters Patent of the United States is:

1. A transfer device in an automatic tool exchanger for exchanging tools between a machine tool spindle and an exchange station, comprising in combination:
   a frame;
   first and second support shafts co-axially mounted on said frame for rotational and axial movement thereon;
   a pair of transfer arms respectively secured to said first and second support shafts and extending in mutually parallel relation and radially thereof, said transfer arms being formed at respective opposite ends with gripping portions;
   cylinder housing means co-axially and rotatably carried on said first and second support shafts;
   first and second rotors contained in said cylinder housing means and respectively connected to said first and second support shafts for rotating the same in opposite directions so as to thereby simultaneously grip said tools by said gripping portions of said transfer arms;
   reciprocation drive means for bodily and axially moving said first and second support shafts so as to selectively remove and reinsert said tools gripped by said transfer arms from and into said machine tool spindle and said exchange station; and
   cylinder rotating means adapted to rotationally drive said cylinder housing means for rotating said first and second support shafts in the same direction so as to thereby replace the mutual position of said tools gripped by said transfer arms.

2. A transfer device as set forth in claim 1, wherein said cylinder rotating means comprises:
   pinion gear means provided on the outer circumference of said cylinder housing means;
   a rack carried by said frame for sliding movement in a tangential direction of said cylinder housing means and engaged with said pinion gear means; and
   a rack actuator for reciprocatively sliding said rack.

3. A transfer device as set forth in claim 2, wherein said cylinder housing means is carried to be moved integrally with said first and second support shafts in the axial direction thereof, and wherein said pinion gear means is extended in the axial direction of said first and second support shafts through a length sufficient to always be in meshing engagement with said rack.

4. A transfer device as set forth in claim 2, wherein said rotors are respectively rotatable relative to said cylinder housing means within an angular extent of a quarter revolution, and wherein said rack is able to rotate said cylinder housing means within an angular extent of a half revolution when slided by said rack actuator.

5. A transfer device as set forth in claim 2, wherein said cylinder housing means comprises:
   a first cylinder housing co-axially and rotatably carried on said first support shaft and containing therein said first rotor, and
   a second cylinder housing co-axially and rotatably carried on said second support shaft and containing therein said second rotor, said first and second cylinder housings being connected with each other for integral rotation.

6. A transfer device as set forth in claim 2, wherein said cylinder housing means comprises a single cylinder housing co-axially and rotatably carried on said first support shaft, being of tubular form, and containing said first and second rotors in such a manner as to allow the same to rotate in the same plane in opposite directions.

7. A transfer device as set forth in claim 2, wherein each of said gripping portions is a semicircular opening.

* * * * *